United States Patent [19]

Osnes et al.

[11] Patent Number: 4,606,188

[45] Date of Patent: Aug. 19, 1986

[54] ELONGATED CONNECTING CHAIN LINK

[75] Inventors: Hans M. Osnes, Bergvik; Rolf Fallgren, Söderhamn, both of Sweden

[73] Assignee: Kockums Industri AB, Soderhamn, Sweden

[21] Appl. No.: 640,755

[22] Filed: Aug. 14, 1984

[30] Foreign Application Priority Data

Aug. 17, 1983 [SE] Sweden ............................ 8304441
Feb. 14, 1984 [SE] Sweden ............................ 8400771

[51] Int. Cl.[4] ............................................ F16G 13/06
[52] U.S. Cl. ............................................ 59/85; 59/87
[58] Field of Search ................ 59/84, 85, 86, 87, 93, 59/78

[56] References Cited

U.S. PATENT DOCUMENTS

| 894,223 | 7/1908 | Nelsen | 59/87 |
| 1,399,646 | 12/1921 | Oppman | 59/85 |
| 2,979,886 | 4/1961 | Robbins | 59/85 |
| 4,418,526 | 12/1983 | Clement | 59/85 |

FOREIGN PATENT DOCUMENTS 1156282 10/1963 Fed. Rep. of Germany .
1197291 3/1966 Fed. Rep. of Germany .

Primary Examiner—Francis S. Husar
Assistant Examiner—David B. Jones
Attorney, Agent, or Firm—Cushman, Darby & Cushman

[57] ABSTRACT

A connecting chain link with two loops for accommodating chain links of attached chain lengths comprises two main link parts identical in shape and dimensions and assembled along a first contact surface and a second contact surface which is complementary to the first one, and a limiting surface in the central portion of the link. The contact surfaces extend between an origin at the outer periphery of the link and close to a transverse axis thereof, and a termination at the inner periphery of one of the loops. The contact surfaces consist of a plurality of differently oriented surface sections and are so shaped as to form a plurality of intermeshing lug and recess means which effectively oppose tension stresses in the longitudinal direction and all stresses in the transverse directions, the latter ones particularly efficiently at the locations of said origins.

28 Claims, 10 Drawing Figures

ELONGATED CONNECTING CHAIN LINK

TECHNICAL FIELD

The invention refers to an elongated connecting chain link particularly for marine use, i.e. a chain link for the interconnection of two chain lengths. A connecting link shall not have too much lower values of tensile strength and fatigue than the common links in the respective chain lengths and it shall also have substantially the same shape and dimensions as the common links so that the connected chain lengths may pass through the same ports and over the same winch drums as each of the chain lengths. The connecting link shall also be readily assemblable and disassemblable even in adverse environmental conditions.

Many different connecting links have already been proposed and also described in patent literature. They can all be ranged in one of two groups, viz. those having an entrance port for the end links of the two chain lengths in the middle of one side ("C-type" links) and those comprising two main parts identical in shape and dimension and which can be locked one with another with the aid of a locking means.

BACKGROUND ART

The present invention refers to connecting links belonging into the last mentioned group. A typical example of a known connecting link of this type is described e.g. in the German patent specification No. 1,156,282 and has a massive central portion roughly corresponding to a stud in a common link and to which central portion is at each side (in the direction of a longitudinal axis of the link) a vertex portion jointed which defines a loop for accomodating an end link of an attached chain length. The link is along complementary peripheric contact surfaces divided into two identical halves comprising each one half of the central portion (divided approximately along said longitudinal axis) and one half of the rest of the link, viz. approximately three quarts of the one vertex portion and approximately one quart of the other vertex portion. The two link halves are held together by a locking means defined by a bolt extending obliquely through the central portion and by co-operating engagement means defined by two cylindrical stumps projecting one from each said contact surface of one link half and accomodated in a cylindrical recess in the corresponding contact surface of the other link half.

In all chain links there is always a risk of deformation even in transverse direction to the longitudinal axis, and the portions of the link in which said recesses are arranged are not sufficiently secured against being bent outwardly, in particular as the presence of the recesses causes a considerable local reduction of the massive part of the cross-sectional area of the link at the respective location. The recesses define also blind bores which easily may be filled by dirt obstructing ready assembly and it is also rather expensive to produce integral cylindrical stumps projecting from a surrounding surface. The peripheric contact surfaces are composed of two sections and they extend each from an origin at the outer periphery of the link to a termination at the inner periphery of one of the loops. Both the origin and the termination lie at the same side of a transverse axis of the link, bisecting the longitudinal axis thereof, and the origin is located adjacent the vertex of the link, i.e. the place where the longitudinal axis intersects the outer periphery. This, however, is a location where the link in use is exposed for maximum shear stress.

Another connecting link of said second group is described in the German patent specification No. 1,197,291. There has each contact surface the shape of a row of saw teeth, the origin and the termination lying on different sides of the transverse axis of the link. At both origins are relatively slender wedge-shaped lugs formed which upon extreme transverse stress may bend out and thus considerably augment the transverse dimension of the link.

DISCLOSURE OF THE INVENTION

An object of the present invention is to provide a connecting chain link having an appreciable area of intermeshing contact surface sections in order to increase resistiveness against tensile and deformative stresses. Another object is to provide a connecting chain link with particularly increased resistiveness against deformation in both senses of the transverse axis at the locations of the origins of the two contact surfaces. These and other objects of the invention are provided by a connecting chain link according to the accompanying patent claims.

BRIEF DESCRIPTION OF THE DRAWINGS

The invention will now be described more in detail with reference to the enclosed drawings which refer to exemplary embodiments and in which.

Identical reference numerals identify in all drawing figures equivalent structural elements.

BEST MODE FOR CARRYING OUT THE INVENTION

Figure 1:
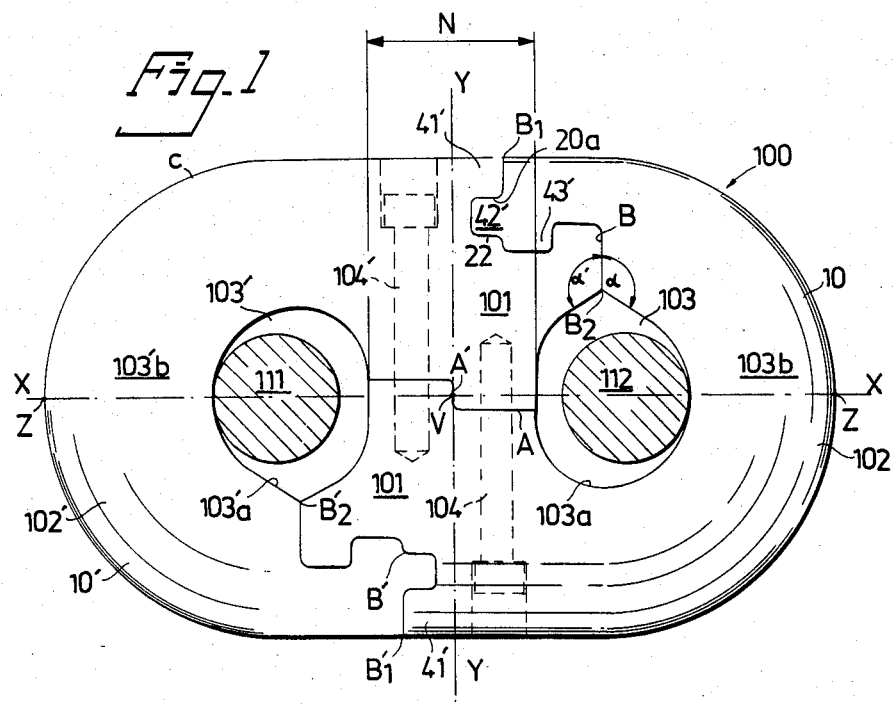
FIG. 1 is a plan view of a first embodiment of a chain link according to the present invention.
Figure 2:
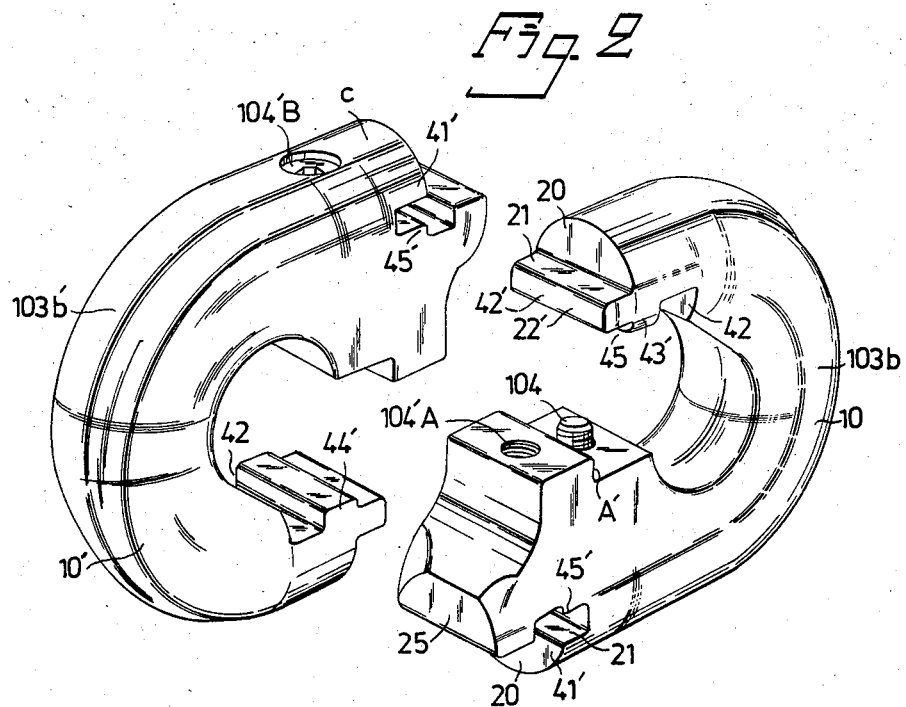
FIG. 2 is a perspective view of the link of FIG. 1 disassembled.
Figure 3:
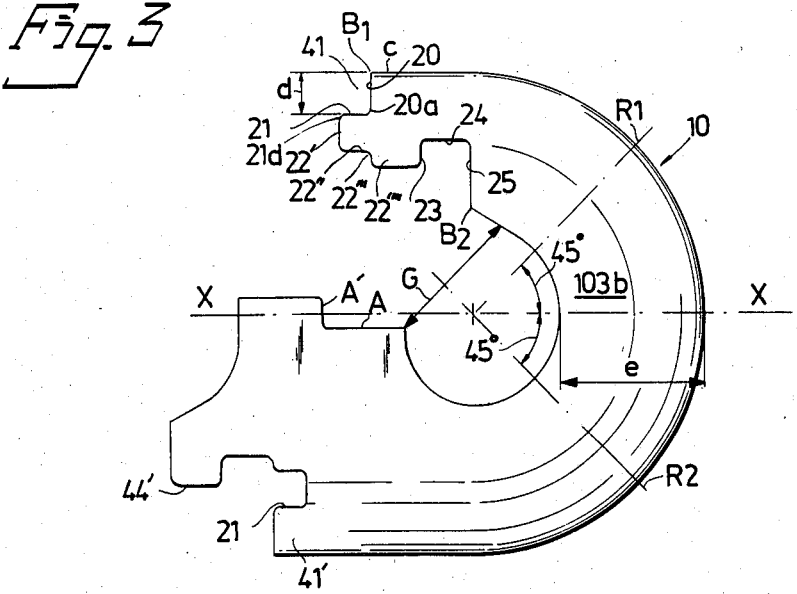
FIG. 3 is a plan view of one of the two main link parts of the link of FIGS. 1 and 2.

According to FIGS. 1 to 3, an elongated connecting chain link 100 has an outer periphery c with two vertices Z, a longitudinal axis X—X passing through the vertices, and a transverse axis Y—Y bisecting at a point V the longitudinal axis. The link comprises a central portion 101, bisected by the transverse axis Y—Y and having a predetermined length N along the longitudinal axis X—X. Two vertex portions 103*b*, 103'*b* join the central portion 101, each from one side along the longitudinal axis X—X. The central portion 101 occupies thus in the connecting link 100 a location which in a common chain link is occupied by a central stud, if such stud is provided. Each vertex portion 103*b*, 103'*b* defines together with an adjoining lateral part of the central portion 101 a loop 103, 103' for accomodating another chain link 111, 112, more precisely an end link of each of the two chain lengths which are united by the connecting link. Each loop 103, 103' has an inner periphery 103a, 103'a.

The connecting link 100 is assembled of two main link parts 10, 10' which are identical in shape and dimensions, each comprising one of said vertex portions 103b, 103'b and a part of said central portion 101 confined by a limiting surface A. The two main link parts 10, 10' bear one against another along a first contact or assembly surface B and a second such surface B'. In the embodiment 100 there are no further component parts besides of the locking means defined by a pair of screw bolts 104, 104', so that each main link part 10, 10' embodies a full half of the whole link 100, and said limiting surface A defines another surface of direct contact between the two main parts.

The second contact surface B' is in shape complementary to the first contact surface B, i.e. it has the same configuration as the first one, but is inverted in the sense of both said axes so that in particular where lugs or projections are formed along the second surface B', recesses are formed along the first contact surface B, and vice versa. It will be readily understood from the study of the drawings that in the assembled connecting link the first contact surface of one main link part bears against the second contact surface of the second main link part and vice versa.

Both contact surfaces B, B' extend between an origin $B_1$, $B'_1$ at the outer periphery c of the link 100, and a termination $B_2$, $B'_2$ at the inner periphery 103a, 103'a of the respective loop 103, 103'. Each contact surface is composed of several sections, i.e. part-surfaces, which subtend an angle one with another so that each two neighbouring sections have a different orientation relative said axes.

The bolts 104, 104' defining the locking means pass through the central portion 101 transversely (in the embodiment shown, exactly at right angles) relative to the longitudinal axis X—X and are screwed into threaded holes such as 104'A (FIG. 2). They have heads such as 104'B provided with hexagonal holes for a corresponding key.

The origins $B_1$, $B'_1$ and the terminations $B_2$, $B'_2$ of each contact surface B, B' lie on the same side of the transverse axis Y—Y, i.e. between this axis and the same vertex Z, the origins being located closer to the transverse axis than the terminations. The origins may be as close to the transverse axis as N/4 (see FIG. 6) and at the utmost as far as N/2, and the terminations are not more spaced from the transverse axis than N (see FIG. 10).

In the following description and in the attached claims the expressions (a)"distal(ly)", (b) "proximal(ly)", (c) "outward(ly)" and (d) "inward(ly)" will be used in the following meanings respectively: (a) more remote from the vertex Z of the respective main link part; (b) closer to the vertex Z of the respective main link part; (c) more remote from the longitudinal axis X—X and (d) closer to the longitudinal axis X—X.

The first contact surface B starts at the origin $B_1$ with an initial surface section or part-surface 20 extending inwardly a predetermined distance d (FIG. 3) in the general direction of the transverse axis to an inner end 20a. From this inner end 20a projects distally and in the general direction of the longitudinal axis X—X a first engagement section 21 to a distal end 21d. The two sections 20 and 21 together define the limitations of a first recess 41 for the accomodation of a first lug means 41' formed by the same surface sections 20 and 21 at the second contact surface B'. The recess 41 is open outwardly and the lug 41' is outwardly limited by the outer peripheric surface c. The distance d of the recess 41 and the lug means 41' corresponds preferably to at least a quarter of the thickness e (FIG. 3) of the link along the longitudinal axis X—X in order that the said lug means 41' be sufficiently strong to oppose at the location of the origin all deformation stresses outwardly in the transverse direction (connecting links may be before delivery tension tested to appr. ⅔ of the stipulated maximum tensile strength of the link and they must after the test continue to be readily assemblable and disassemblable).

Turning now to the termination $B_2$ at the inner periphery 103a, a terminal section 25 extends therefrom outwardly in the general direction of the transverse axis, and between this terminal section and the first engagement section 21 is provided a composite intermediate section 22, a second engagement section 23 and a connecting section 24.

The composite intermediate section 22 comprises at least two, and in the embodiment of FIGS. 1 to 3 as much as four sub-sections. The first sub-section 22' begins at the distal end 21d of the first engagement section 21 and extends therefrom a predetermined distance inwardly generally in the direction of the transverse axis. The said two sections 21 and 22 (more precisely 22') define together a second lug means 42' which together with the first lug means 41' at the other main link part opposes in the region of the origins $B_1$ and $B'_1$ stresses in both directions of the transverse axis (see double arrows Q and Q' in FIG. 10.

The second engagement section 23 extends in the general direction of the transverse axis between an outward end and an inward end and is at the latter connected to the fourth sub-section 22'''' and defines therewith a third lug means 43'. The second and third subsections 22'' and 22''' are in the embodiment of FIGS. 1 to 3 shaped so as to form an additional recess 45 for an additional lug means 45' on the other main link part.

Figure 10:
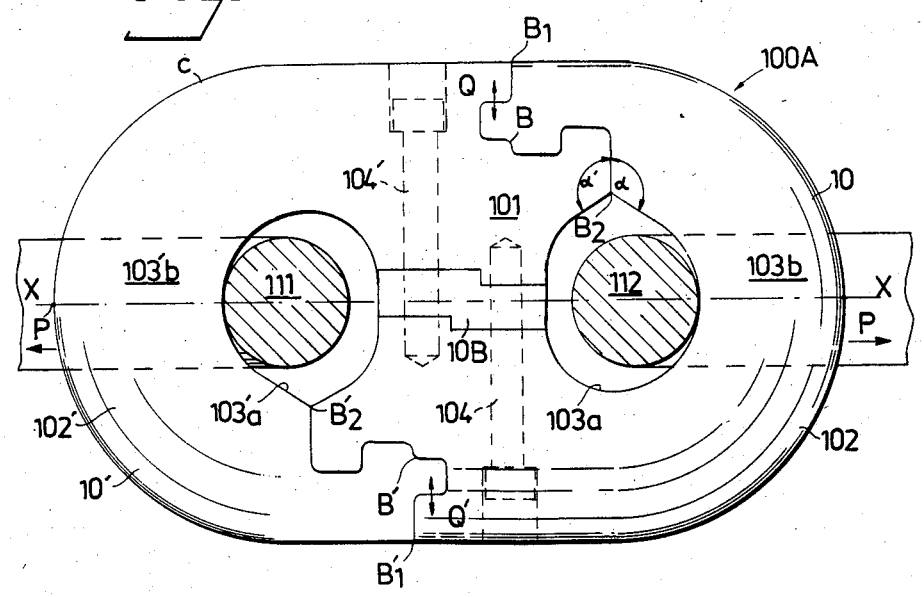
FIG. 10 is a plan view of a fifth embodiment.

From the outward end of the second engagement section 23 extends distally and generally in the direction of the longitudinal axis the connecting section 24 between a proximal end and a distal end at which it joins the terminal section 25 at the outward end thereof. Thus a second recess 42 is obtained having the connecting section 24 as bottom limitation, the outer part of the terminal section 25 as a distal lateral limitation and the second engagement section 23 as a proximal lateral limitation. The second recess 42 is provided for the accomodation of a fourth lug means 44' on the other main link part which together with the said third lug means 43' opposes longitudinal tractional stresses in the directions of the two arrows P (FIG. 10). It will be noted that further means for opposing longitudinal tractional stresses is on the one hand the above mentioned additional lug means 45', and on the other hand a step A' arranged on the limiting surface A.

A chain link is subject to maximum shearing stress at locations approximately at 45° angular distance from the longitudinal axis, measured from the centre of the respective loop. These locations are indicated in FIG. 3 with the aid of radii $R_1$ and $R_2$ and it will be noted that as well the origins $B_1$, $B'_1$ as the terminations $B_2$, $B'_2$ lie at a safe distance from these locations. The inner peripheries 103a, 103'a are at the terminations $B_2$, $B'_2$ shaped so as to be straight and to subtend blunt angles α, α' of e.g. 100°–104° with the terminal sections 25. Thereby is provided in a direction at right angles to radius $R_2$ a passage G into the respective loop 103, 103' which is sufficiently large to allow introduction of a link 111, 112.

Figure 4:
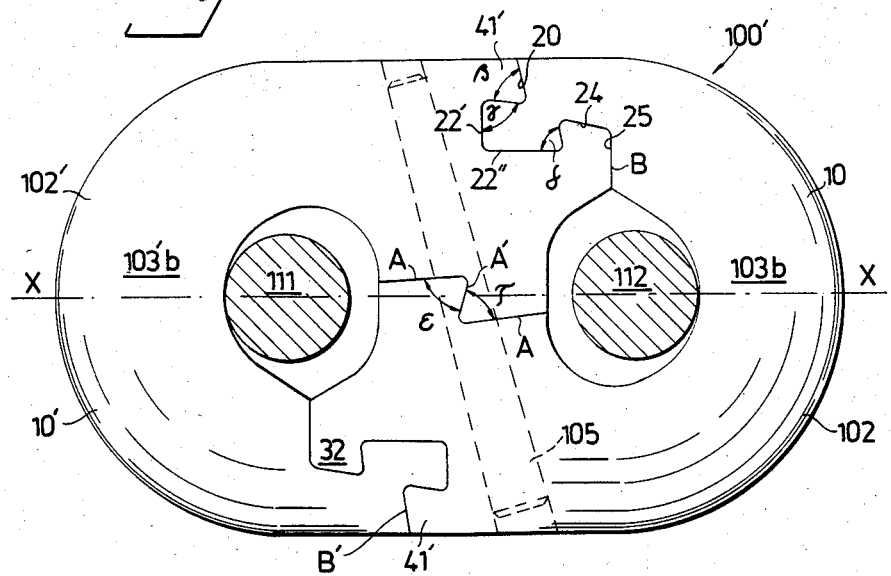
FIG. 4 is a plan view of a second embodiment.

In the embodiment of FIGS. 1 to 3 all surface sections extending in the general direction of one of the axes were exactly parallel with the respective axis. In FIG. 4 is shown an embodiment 100' where such surface sections subtend angles β, γ and δ one with another which are either smaller or greater than 90°, so that at least some inner corners in the recesses have sharp angles. Always at least one of such two surface sections is not exactly parallel with the respective axis but subtends therewith an angle of maximally 15°. Also the sections of the limiting surface A subtend one with another sharp angles—and with the respective axes angles up to 15°. Consequently, "extending in the general direction of an axis" means in the present specification and claims "subtending an angle of 0° to 15° with the respective axis".

The embodiment 100' of FIG. 4 differs further from the embodiment 100 in that the connecting section 22 comprises only two sub-sections 22' and 22", and in that the locking means is defined by a single, non-threaded bolt 105.

Figure 5:
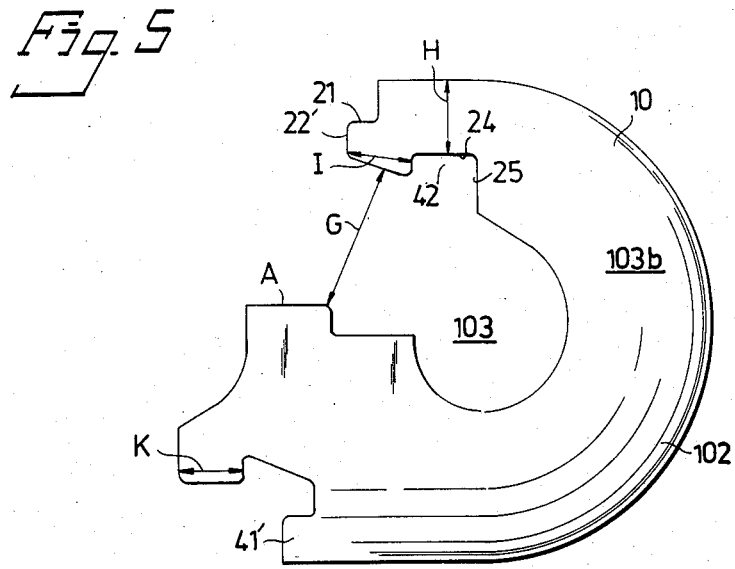
FIG. 5 is a plan view of one of the two main link parts of the link of FIG. 4.

In FIG. 5 is shown another modification of a constituant main part of a chain link according to the present invention, wherein a sufficiently large passage G has been obtained in spite of increased dimensions H, I, K by the sub-section 22" of the intermediate section 22 extending markedly obliquely, i.e. subtending a greater angle than 15° with the longitudinal axis X—X.

Figure 6:
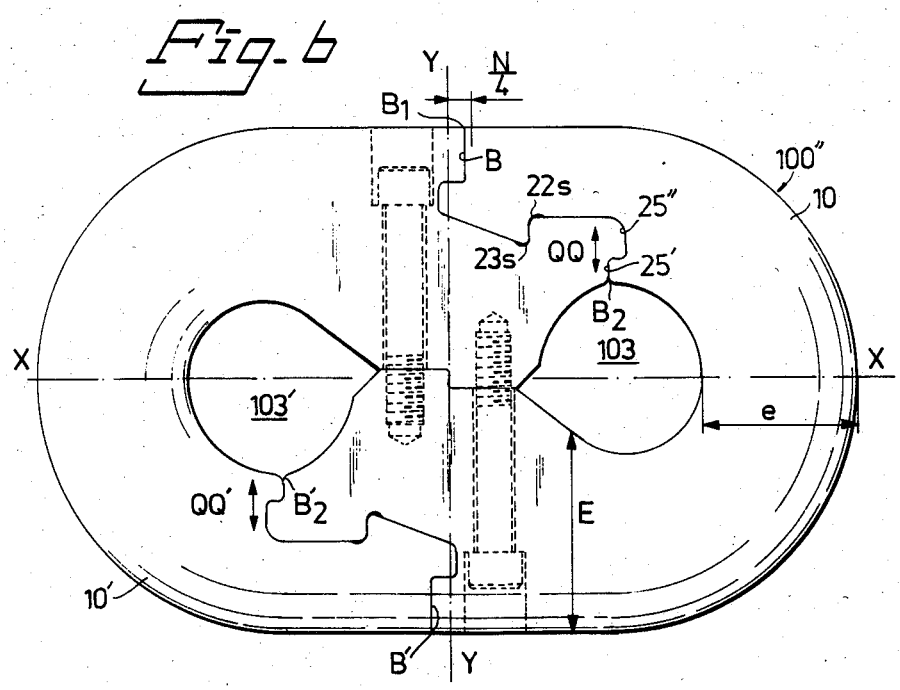
FIG. 6 is plan view of a third embodiment.
Figure 7:
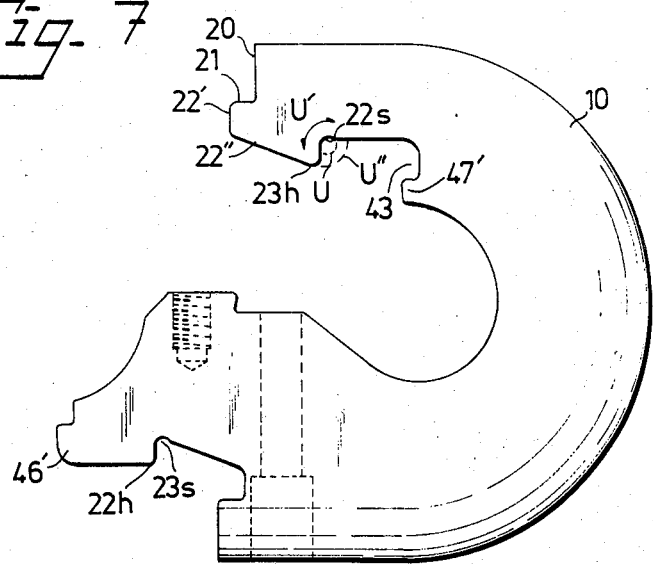
FIG. 7 is a plan view of one of the two main link parts of the link of FIG. 6.

In FIGS. 6 and 7 is shown a further embodiment 100" built up of two main link parts which are a variation of the link part of FIG. 5. The terminal section 25 is composite, its outward portion 25" being somewhat distally recessed relative the inward portion 25' so that another additional recess 43 is obtained which is adjacent to and connected with the second recess 42 and accomodates another additional lug means 46' on the other main link part. By this additional recess 43 is also a further lug means 47' formed at the terminations B₂ and B'₂ in analogy to the first lug means 41' at the origins. Said two lug means 46' and 47' oppose in the region of the terminations stresses in both senses of the transverse axis (see double arrows QQ and QQ' in FIG. 6).

The thickness of the vertex portions 103b, 103'b increases towards the adjacent part of the central portion 101 from a minimum value e along the longitudinal axis X—X to a maximum value E close to the central portion, so that the vertex portion adopts essentially the shape of a crane hook with increased strength at E. The part 103aa, 103'aa of the inner periphery 103a, 103'a between the location E and the adjacent end of the limiting surface A is straight for better access into the respective loop.

Figure 9:
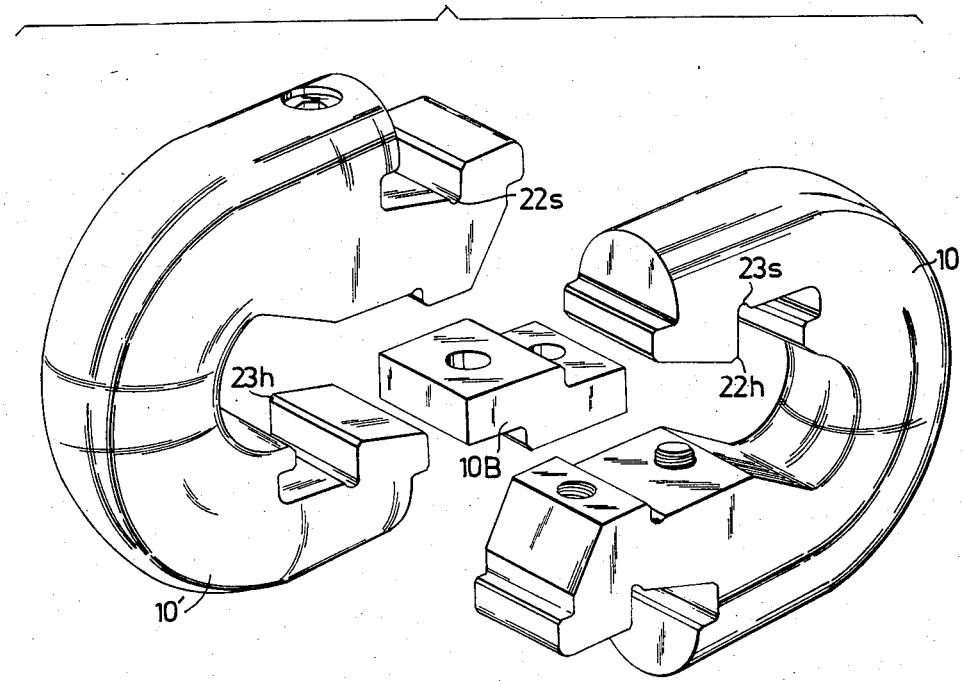
FIG. 9 is a perspective view of the link of FIG. 8 disassembled.

For a good fit of the two main parts 10, 10', i.e. their respective contact surfaces bearing one against another along their entire length, and in order to increase the fatigue strength of the link, at least some of the inner corners obtained in a recess when two surface sections meet at an angle of 90° or somewhat less, are provided with relief grooves such as 22s, 23s (FIG. 7) having cylindrical surfaces with a longer radius than the respective outer corners such as 22h, 23h of the corresponding lug means, so that a small free space is provided about these outer corners (see also FIG. 9).

Said inner corners are very critical locations in a link of the present kind, and therefore it is preferable to give the relief grooves a surface having increased resistivity e.g. by means of case hardening or similar. Preferably, however, the following procedure may be adopted according to the present invention. When starting to make the link part, a blank is used which in the respective inner corner has an addition of material U in excess of the desired final shape of the corner. A hole is drilled in the excess material with a smaller radius than what the relief groove shall have. The hole is thereupon expanded by a non-chip detaching method to the desired radius, e.g. 5 mm. The expansion may be achieved e.g. by driving in one or several, possibly tapered, shanks whereby material at the periphery of the hole, thus also in a zone U', is compressed. Thereupon are the undesired peripheric portions U" of the excess material removed.

Figure 8:
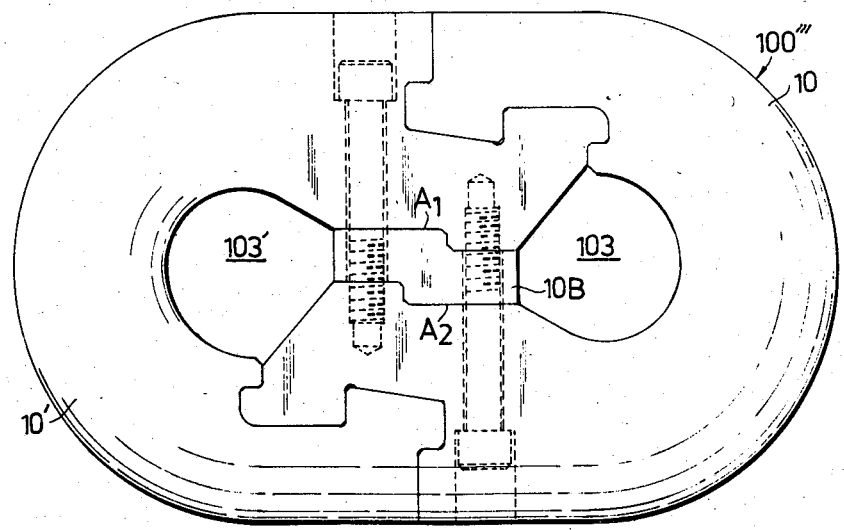
FIG. 8 is a plan view of a fourth embodiment.

Another approach to the problem of a sufficient passage G is shown in the embodiments 100'" and 100"" of FIGS. 8 to 10. The embodiment 100'" of FIGS. 8 to 10 is assembled of two main parts 10, 10' resembling those of FIGS. 6 and 7 with the difference that they are somewhat shorter in the parts defining the central portion and that a third link member, viz. an interposed member 10B, limited by limiting surfaces A₁, A₂ which are complementary to those of the main link parts, is interposed between the two main link parts. In the interposed part 10B are two non-threaded holes for the locking means bolts 104, 104' provided. The chain links 111, 112 (FIG. 1) are introduced into the loops 103, 103' before the interposed part 10B is put in place.

The embodiment 100A of FIG. 10 is a modification of the embodiment 100 of FIG. 1 in that an interposed part 10B has been provided. The plan view of one main part 10 of this link 100A would differ from the plan view of FIG. 3 only in that the whole limiting surface A would lie a bit under the longitudinal axis.

It will be of course realised that both main link parts 10, 10' are in manufacture one single part, two pieces thereof in inverted relationship defining the two main link parts of one assembled link.

We claim:

1. An elongated connecting chain link having an outer periphery with two vertices, a longitudinal axis passing through said vertices, and a transverse axis bisecting the longitudinal axis, said link comprising a central portion bisected by the transverse axis and having a predetermined length along the longitudinal axis, and two vertex portions each joining from one side the central portion and defining therewith two loops for accomodating other chain links and having each an inner periphery, the connecting link being assembled of two identical main link parts, each comprising one said vertex portion and a part of said central portion confined by a central limiting surface, said two main parts bearing one against another along a first contact surface and a second contact surface which is complementary shaped to the first one, both said contact surfaces extending between an origin at said outer periphery and a termination at the inner periphery of one of said loops and being composed of several sections differently oriented relative said axes, a locking means passing through said central portion transversely to the longitudinal axis and holding all parts of the connecting link releasably together, wherein said origin and termination of each contact surface lie on the same side of and spacedly from the transverse axis, the origin being closer to the transverse axis then the termination, the contact surface terminations being further from said transverse axis than the longitudinally innermost portions of the inner periphery of said loops, and the central limiting surfaces being closer to the longitudinal axis than the transversely outermost portions of the inner periphery of said loops, and wherein, the first contact surface comprises:

an initial section extending from said origin a predetermined distance inwardly in the general direction of the transverse axis to an inner end of the section;

a first engagement section projecting at said inner end distally from the initial section in the direction of the longitudinal axis to a distal end and defining together with the initial section the limitation of a first recess for accomodating a first lug means of the other main link part;

a terminal section extending from said termination outwardly in the general direction of the transverse axis;

a second engagement section extending generally in the direction of the transverse axis between an inner end and an outer end and located between the first engagement section and the terminal section;

a connecting section projecting from the outer end of the second engagement section proximally generally in the direction of the longitudinal axis, and defining together with the second engagement section a bottom limitation and one side limitation of a second recess for the accomodation of a second lug means on the other main link part, the second side limitation of said second recess being defined by an outward part of said terminal section whereto the connecting section is attached;

a composite intermediate section comprising at least two sub-sections and extending between said first and second engagement sections and defining together with the first engagement section a third lug means co-operating with the first lug means in opposing transverse stresses, and defining at the same time together with the second engagement section a fourth lug means co-operating with said second lug means in opposing longitudinal stresses.

2. A link according to claim 1, wherein a separate interposed part is provided in the central portion between the two main link parts and is limited by surfaces which are co-figurative with the said central limiting surfaces of the two main link parts, whereby easier access into the loop of each main link part is obtained upon assembly.

3. A link according to claim 1, wherein the surface sections extending generally in the direction of one of the axes subtend an angle of 0° to 15° with the respective axis.

4. A link according to claim 1, wherein the terminal section is straight and non-composite.

5. A link according to claim 1, wherein the connecting section has a first subsection extending from said distal end of the first engagement section inwardly generally in the direction of the transverse axis to an inward end, and a second subsection connecting this inward end of the first connecting section with the said inward end of the second engagement section.

6. A link according to claim 5, wherein said second subsection is straight.

7. A link according to claim 1, wherein said predetermined distance is at least one quarter of the thickness of the link along the longitudinal axis.

8. A link according to claim 1, wherein each vertex portion has in a plane comprising said two axes a thickness which gradually increases from a minimum value at the location where the longitudinal axis cuts the vertex portion to a location where the vertex portion merges with the central portion so as to give the main link part the appearance and rigidity pattern of a crane hood.

9. An elongated connecting chain link having an outer periphery with two vertices, a longitudinal axis passing through said vertices, and a transverse axis bisecting the longitudinal axis, said link comprising a central portion bisected by the transverse axis and having a predetermined length along the longitudinal axis, and two vertex portions each joining from one side the central portion and defining therewith two loops for accomodating other chain links and having each an inner periphery, the connecting link being assembled of two identical main link parts, each comprising one said vertex portion and a part of said central portion confined by a central limiting surface, said two main parts bearing one against another along a first contact surface and a second contact surface which is complementary shaped to the first one, both said contact surfaces extending between an origin at said outer periphery and a termination at the inner periphery of one of said loops and being composed of several sections differently oriented relative said axes, a locking means passing through said central portion transversely to the longitudinal axis and holding all parts of the connecting link releasably together, wherein said origin and termination of each contact surface lie on the same side of the transverse axis, the origin being closer to the transverse axis than the termination, and wherein, the first contact surface comprises:

an initial section extending from said origin a predetermined distance inwardly in the general direction of the transverse axis to an inner end of the section;

a first engagement section projecting at said inner end distally from the initial section in the direction of the longitudinal axis to a distal end and defining together with the initial section the limitation of a first recess for accomodating a first lug means of the other main link part;

a terminal section extending from said termination outwardly in the general direction of the transverse axis;

a second engagement section extending generally in the direction of the transverse axis between an inner end and an outer end and located between the first engagement section and the terminal section;

a connecting section projecting from the outer end of the second engagement section proximally generally in the direction of the longitudinal axis, and defining together with the second engagement section a bottom limitation and one side limitation of a second recess for the accomodation of a second lug means on the other main link part, the second side limitation of said second recess being defined by an outward part of said terminal section whereto the connecting section is attached;

a composite intermediate section comprising at least two sub-sections and extending between said first and second engagement sections and defining together with the first engagement section a third lug means co-operating with the first lug means in opposing transverse stresses, and defining at the same time together with the second engagement section a fourth lug means co-operating with said second lug means in opposing longitudinal stresses;

said terminal section being composite comprising at least two sub-sections, said outward part of said terminal section being proximally retracted relative to the rest of the terminal section so that an additional recess is obtained adjacent to and connected with the second recess for the accomodation of a fifth lug means on the other main link part, and sixth lug means formed between said additional recess and said inner periphery, the fifth and sixth lug means co-operating to oppose transverse stresses in the region of the location of the termination.

10. A link according to claim 9, wherein a separate interposed part is provided in the central portion between the two main link parts and is limited by surfaces which are co-figurative with the said central limiting surfaces of the two main link parts, whereby easier access into the loop of each main link part is obtained upon assembly.

11. A link according to claim 9, wherein the surface sections extending generally in the direction of one of the axes subtend an angle of 0°0 to 15° with the respective axis.

12. A link according to claim 9, wherein the connecting section has a first subsection extending from said distal end of the first engagement section inwardly generally in the direction of the transverse axis to an inward end, and a second subsection connecting this inward end of the first connecting section with the said inward end of the second engagement section.

13. A link according to claim 12 wherein said subsection is straight.

14. A link according to claim 9 wherein said predetermined distance is at least one quarter of the thickness of the link along the longitudinal axis.

15. A link according to claim 9, wherein each vertex portion has in a plane comprising said two axes a thickness which gradually increases from a minimum value at the location where the longitudinal axis cuts the vertex portion to a location where the vertex portion merges with the central portion so as to give the main link part the appearance and rigidity pattern of a crane hood.

16. An elongated connecting chain link having an outer periphery with two vertices, a longitudinal axis passing through said vertices, and a transverse axis bisecting the longitudinal axis, said link comprising a central portion bisected by the transverse axis and having a predetermined length along the longitudinal axis, and two vertex portions each joining from one side the central portion and defining therewith two loops for accomodating other chain links and having each an inner periphery, the connecting link being assembled of two identical main link parts, each comprising one said vertex portion and a part of said central portion confined by a central limiting surface, said two main parts bearing one against another along a first contact surface and a second contact surface which is complementary shaped to the first one, both said contact surfaces extending between an origin at said outer periphery and a termination at the inner periphery of one of said loops and being composed of several sections differently oriented relative said axes, a locking means passing through said central portion transversely to the longitudinal axis and holding all parts of the connecting link releasably together, wherein said origin and termination of each contact surface lie on the same side of the transverse axis, the origin being closer to the transverse axis than the termination, and wherein, the first contact surface comprises:

an initial section extending from said origin a predetermined distance inwardly in the general direction of the transverse axis to an inner end of the section;

a first engagement section projecting at said inner end distally from the initial section in the direction of the longitudinal axis to a distal end and defining together with the initial section the limitation of a first recess for accomodating a first lug means of the other main link part;

a terminal section extending from said termination outwardly in the general direction of the transverse axis;

a second engagement section extending generally in the direction of the transverse axis between an inner end and an outer end and located between the first engagement section and the terminal section;

a connecting section projecting from the outer end of the second engagement section proximally generally in the direction of the longitudinal axis, and defining together with the second engagement section a bottom limitation and one side limitation of a second recess for the accomodation of a second lug means on the other main link part, the second side limitation of said second recess being defined by an outward part of said terminal section whereto the connecting section is attached;

a composite intermediate section comprising at least two sub-sections and extending between said first and second engagement sections and defining together with the first engagement section a third lug means co-operating with the first lug means in opposing transverse stresses, and defining at the same time together with the second engagement section a fourth lug means co-operating with said second lug means in opposing longitudinal stresses; and means defining a clearance groove provided at least at one location where in a recess two surface sections meet in an inner corner at an angle equal or close to 90°, for stress-free accomodation of the respective corner of the lug means fitted in the recess.

17. A link according to claim 16, wherein a separate interposed part is provided in the central protion between the two main link parts and is limited by surfaces which are co-figurative with the said central limiting surfaces of the two main link parts, whereby easier access into the loop of each main link part is obtained upon assembly.

18. A link according to claim 16, wherein the surface sections extending generally in the direction of one of the axes subtend an angle of 0° to 15° with the respective axis.

19. A link according to claim 16, wherein the connecting section has a first subsection extending from said distal end of the first engagement section inwardly generally in the direction of the transverse axis to an inward end, and a second subsection connecting this inward end of the first connecting section with the said inward end of the second engagement section.

20. A link according to claim 19 wherein said subsection is straight.

21. A link according to claim 16 wherein said predetermined distance is at least one quarter of the thickness of the link along the longitudinal axis.

22. A link according to claim 16, wherein each vertex portion has in a plane comprising said two axes a thickness which gradually increases from a minimum value at the location where the longitudinal axis cuts the vertex portion to a location where the vertex portion merges with the central portion so as to give the main link part the apperance and rigidity pattern of a crane hood.

23. An elongated connecting chain link having an outer periphery with two vertices, a longitudinal axis passing through said vertices, and a transverse axis bisecting the longitudinal axis, said link comprising a central portion bisected by the transverse axis and having a predetermined length along the longitudinal axis, and two vertex portions each joining from one side the central portion and defining therewith two loops for accomodating other chain links and having each an inner periphery, the connecting link being assembled of two identical main link parts, each comprising one said vertex portion and a part of said central portion confined by a central limiting surface, said two main parts bearing one against another along a first contact surface and a second contact surface which is complementary shaped to the first one, both said contact surface extending between an origin at said outer periphery and a termination at the inner periphery of one of said loops and being composed of several sections differently oriented relative said axis, a locking means passing through said central portion transversely to the longitudinal axis and holding all parts of the connecting link releasably together, wherein said origin and termination of each contact surface lie on the same side of the transverse axis, the origin being closer to the transverse axis than the termination, and wherein, the first contact surface comprises:

- an initial section extending from said origin a predetermined distance inwardly in the general direction of the transverse axis to an inner end of the section;
- a first engagement section projecting at said inner end distally from the initial section in the direction of the longitudinal axis to distal end and defining together with the initial section the limitation of a first recess for accomodating a first lug means of the other main link part;
- a terminal section extending from said termination outwardly in the general direction of the tranverse axis;
- a second engagement section extending generally in the direction of the transverse axis between an inner end and an outer end and located between the first engagement section and the terminal section;
- a connecting section projecting from the outer end of the second engagement section proximally generally in the direction of the longitudinal axis, and defining together with the second engagement section a bottom limitation and one side limitation of a second recess for the accomodation of a second lug means on the other main link part, the second side limitation of said second recess being defined by an outward part of said terminal section whereto the connecting section is attached;
- a composite intermediate section comprising at least two sub-sections and extending between said first and second engagement sections and defining together with the first engagement section a third lug means co-operating with the first lug means in opposing transverse stresses, and defining at the same time together with the second engagement section a fourth lug means co-operating with said second lug means in opposing longitudinal stresses;
- said connecting section having a first subsection extending from said distal end of the first engagement section inwardly generally in the direction of the transverse axis to an inward end, and a second subsection connecting this inward end of the first connecting section with the said inward end of the second engagement section; and
- said second subsection having a distally turned step defining a recess between said third and fourth lug means.

24. A link according to claim 23, wherein a separate interposed part is provided in the central portion between the two main link parts and is limited by surfaces which are co-figurative with the said central limiting surfaces of the two main link parts, whereby easier access into the loop of each main link part is obtained upon assembly.

25. A link according to claim 23, wherein the surface sections extending generally in the direction of one of the axes subtend an angle of 0° to 15° with the respective axis.

26. A link according to claim 23 wherein said subsection is straight.

27. A link according to claim 23 wherein said predetermined distance is at least one quarter of the thickness of the link along the longitudinal axis.

28. A link according to claim 23, wherein each vertex portion has in a plane comprising said two axes a thickness which gradually increases from a minimum value at the location where the longitudinal axis cuts the vertex portion to a location where the vertex portion merges with the central portion so as to give the main link part the appearance and rigidity pattern of a crane hood.

* * * * *